June 26, 1951     L. SWEAT ET AL     2,558,324

BRUSH DRAG

Filed Nov. 5, 1948     2 Sheets-Sheet 1

Lestor Sweat
Theron Chatwin
Kenneth Sweat
INVENTORS

BY *C.A. Snow & Co.*
ATTORNEYS.

June 26, 1951  L. SWEAT ET AL  2,558,324
BRUSH DRAG
Filed Nov. 5, 1948  2 Sheets-Sheet 2
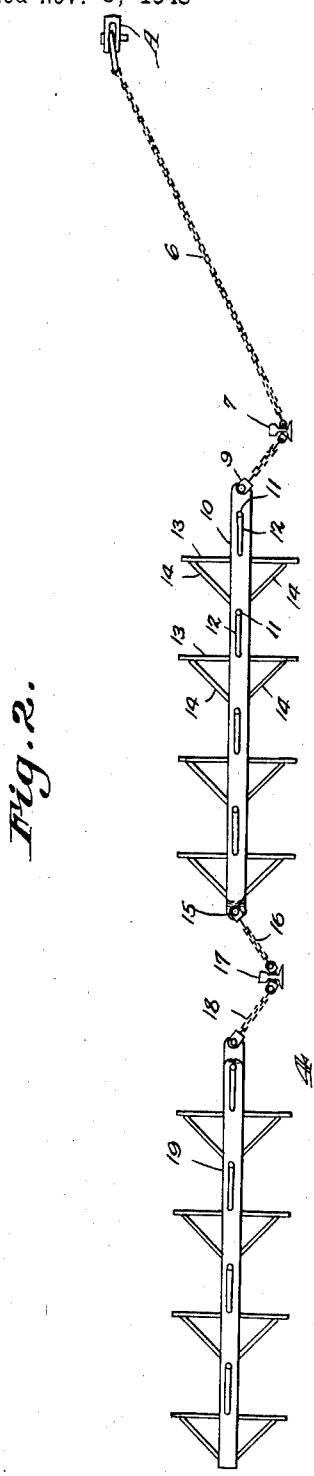
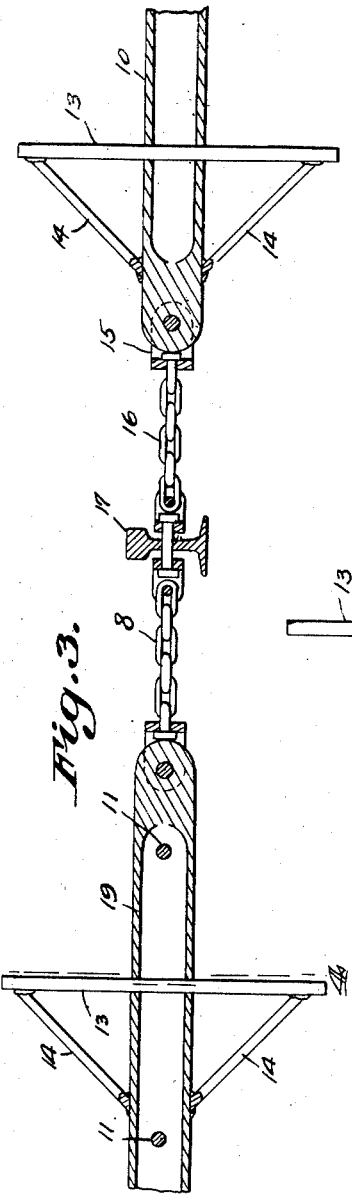
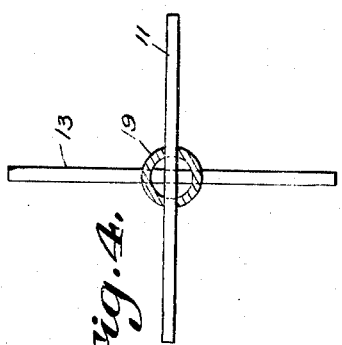
Lestor Sweat
Theron Chatwin
Kenneth Sweat
INVENTORS Patented June 26, 1951

2,558,324

UNITED STATES PATENT OFFICE 2,558,324

BRUSH DRAG

Lestor Sweat and Theron Chatwin, Heber City, and Kenneth Sweat, Fruitland, Utah

Application November 5, 1948, Serial No. 58,392

2 Claims. (Cl. 55—32)

This invention relates to a brush drag, and has particular reference to a drag adapted to be drawn by a tractor or similar vehicle, for the purpose of clearing land from sagebrush and the like.

Particularly in the western part of the country, there is tremendous acreage which has never been brought into cultivation. At present, the reclamation of this land, with a view to reseeding it and placing it into effective use, is a continuing project. However, before the ground can be successfully reseeded, it is necessary that the native sage brush and similar plants be uprooted.

To this end, the invention aims to provide a drag construction that will be rugged, capable of production at relatively low cost, efficient in uprooting the brush, and will clear a wide swath.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 2 is a side elevational view.

Figure 3 is a fragmentary longitudinal section through an intermediate portion of the drag.

Figure 4 is a section on line 4—4 of Fig. 3.

Figure 1:
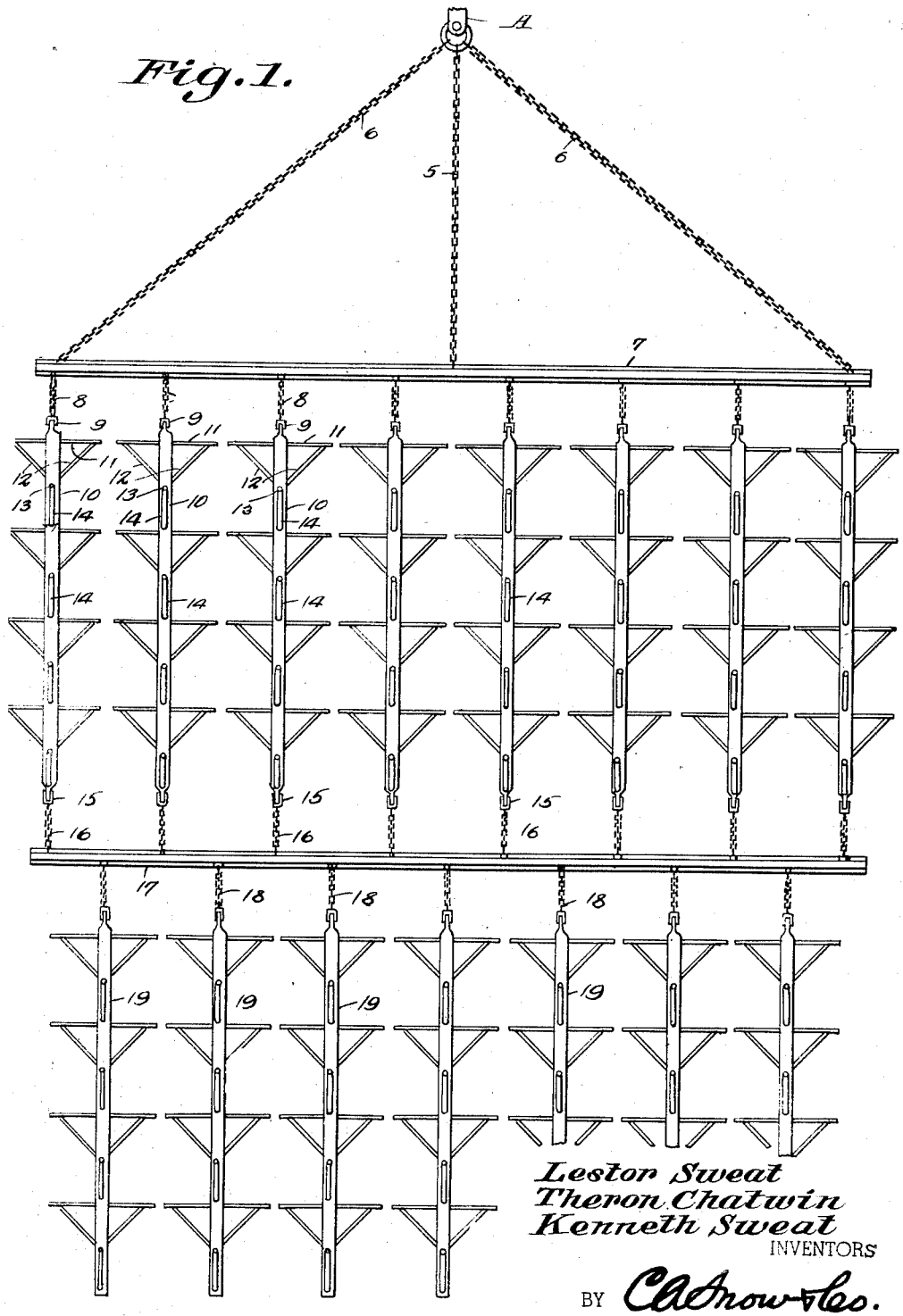
Figure 1 is a top plan view of a drag constructed in accordance with the invention, a portion being broken away.

Referring to the drawings in detail, the reference character A designates a hitch whereby the drag is coupled to a tractor or similar vehicle, and of course, the hitch does not constitute part of the present invention.

At the front end of the drag I provide the center chain 5, and the side chains 6, these all being connected at their front ends to the hitch A, and said side chains 6 diverging rearwardly and being connected at their rear ends to the ends of a transversely disposed rail 7, the rear end of the center chain 5 being connected to the center of said rail. Said rail can be an ordinary rail such as used in laying railroad track.

At spaced intervals from end to end of said rail 7, there are connected to the rail the front ends of chains 8, each connected, as by a pivoted clevis 9, to the front end of a drag member 10. Said drag members 10 are extended in the direction of the path of movement of the drag, that is, they are disposed perpendicular to the cross rail 7. Additionally, it may be noted that the connection of the drag members 10 to said cross rail 7, embodying the flexible elements 8 and the pivoted connections 9, permit swiveling of said drag members 10, for a reason to become apparent.

The construction of all the drag members 10 is the same, so only one will be described. In this connection, from end to end of the drag member 10, there are formed therein diametrically opposed openings, and through each pair of diametrically opposed openings, a peg or cross bar 11 is extended. Said pegs or cross bars 11 can be driving fits in said opening.

The cross bars 11 project from opposite sides of the drag member 10, and it is to be noted that the cross bars are extended transversely of the drag members, so as to be disposed at right angles to the path of movement of said member.

For the purpose of reinforcing the cross bar 11, and preventing any tendency thereof toward looseness or end play, the braces 12 are provided, a pair of braces being used with each cross bar 11, with each brace extending from an end of the cross bar rearwardly to the drag member 10, and being welded both to said drag member and to the end of the cross bar.

Also at spaced intervals from end to end of the drag member 10, and alternating with the cross bars 11, are disposed the cross bars 13. These, like the cross bars 11, are disposed at right angles to the path of movement of the drag members, but they are also at right angles to the cross bars 11, this construction being best shown by Fig. 4.

By means of pivoted clevises 15, there are secured to the rear ends of the drag members 10 the chains or other flexible elements 16, that are secured to a second cross rail 17. Extended rearwardly from the cross rail 17 are the chains 18, secured to drag members 19. Drag members 19, as best seen from Fig. 1, are in staggered relation to the drag members 10. They are formed with cross bars arranged exactly as in the case of the drag members 10, however.

The drag can be of any width and of any length desired. In the illustration provided, there are only two groups of drag members, but there can be more or less, without departure from the spirit of the invention.

In use, the device is dragged over ground to be cleared, and will effectively clear said ground of sagebrush or any other plant life. As the drag moves along, the cross bars 11 and 13 engage the sagebrush, and uproot it. Each drag bar 10 can rotate on its major or longitudinal axis, independently of any other drag member 10. Generally, however, such rotatable movement of the respective drag members will not be continuous, nor will it be unidirectional. Rotatable movement will be imparted to a drag member 10 if, for example, the cross bars 11 or 13 of said drag member strike some oblique unyielding surface such as an outcropping of rock. The cross bars 11 or 13 striking said unyielding surface are permitted to take the line of least resistance, in effect, so as to slide upwardly or laterally off the unyielding obstruction. By reason of the chain connections 8 and 16 at opposite ends of the drag member 10, connecting said drag member to the rails 7 and 17, any one or more of the drag members 10 can slide upwardly to a certain extent over the obstruction, or swivel or rotate on their longitudinal axes. The swiveling or rotatable movement is permitted because the chains 8 and 16 themselves can twist to permit the rotatable movement. Additionally, as may be noted from Fig. 3, the connections at opposite ends of the respective chains comprise swivel bolts connecting the chains to the clevises or to the rails as the case may be. With respect to said rotatable movement, a clump of sagebrush might itself, as it is uprooted, become an object under a particular drag member 10 and slightly to one side of said drag member so as to force a cross bar at one side of the drag member upwardly so as to give rotatable movement to the drag member. The independently rotatable and flexibly mounted drag members 10 have the function, so far as the rotatable and flexible mountings are concerned, of preventing the hanging up of the drag upon unyielding obstructions, and also turning over the drag members periodically so as to turn downwardly a cleaner series of cross bars.

What is claimed is:

1. A brush drag including a cross rail, a plurality of elongated drag members flexibly and swivelly connected to said cross rail, said drag members extended in the direction of movement of said drag, a series of cross bars spaced longitudinally of each drag member, another series of cross bars spaced longitudinally of each drag member and staggered radially relative to the first series, a rear cross rail, and flexible and swivel connections between the rear ends of the drag members and said rear cross rail.

2. A brush drag including a transversely disposed and elongated cross rail, a plurality of elongated drag members connected flexibly and swivelly to the cross rail at spaced intervals longitudinally of said cross rail, a series of cross bars on each drag member and disposed longitudinally of said drag member, said cross bars being at right angles to the path of movement of the drag, a second series of cross bars disposed longitudinally of each drag member and including cross bars disposed transversely of the path of movement of the drag, one series being staggered radially relative to the other, a rear cross rail connected to the rear ends of the drag members, and a second series of drag members connected to the rear cross rail in staggered relation relative to the first drag member.

LESTOR SWEAT.
THERON CHATWIN.
KENNETH SWEAT.

REFERENCES CITED

The following references are of record in the file of this patent:

UNITED STATES PATENTS

| Number | Name | Date |
|---|---|---|
| 1,096,844 | Kramer | May 19, 1914 |